(12) United States Patent
Salo et al.

(10) Patent No.: US 7,283,817 B2
(45) Date of Patent: Oct. 16, 2007

(54) RECEIVER

(75) Inventors: Juha Salo, Littoinen (FI); Janne Aaltonen, Turku (FI)

(73) Assignee: Nokia Corporation, Espoo (FI)

( * ) Notice: Subject to any disclaimer, the term of this patent is extended or adjusted under 35 U.S.C. 154(b) by 669 days.

(21) Appl. No.: 09/893,890

(22) Filed: Jun. 29, 2001

(65) Prior Publication Data

US 2002/0010763 A1    Jan. 24, 2002

(30) Foreign Application Priority Data

Jun. 30, 2000    (GB)    ................................. 0016238.8

(51) Int. Cl.
*H04Q 7/20*    (2006.01)
(52) U.S. Cl. ............................. 455/426.1; 455/426.2; 455/425; 455/432.2; 455/407; 455/418
(58) Field of Classification Search ................ 455/426, 455/5.1, 4.2, 3.01, 3.02, 3.04, 3.05, 5.01; 370/487; 348/14.01
See application file for complete search history.

(56) References Cited

U.S. PATENT DOCUMENTS

| 5,822,324 | A | 10/1998 | Kostresti et al. |
| 5,960,086 | A | 9/1999 | Atalla |
| 6,005,603 | A | 12/1999 | Flavin ............................ 348/9 |
| 6,023,689 | A | 2/2000 | Herlin et al. |
| 6,052,145 | A | 4/2000 | Macrae et al. ................ 348/10 |
| 6,081,693 | A | 6/2000 | Wicks |
| 6,510,515 | B1 | 1/2003 | Raith |
| 6,567,796 | B1 * | 5/2003 | Yost et al. ...................... 707/2 |
| 6,580,906 | B2 | 6/2003 | Bilgic et al. |
| 6,606,481 | B1 * | 8/2003 | Tegler et al. ................ 370/487 |
| 6,662,020 | B1 | 12/2003 | Aaro et al. |
| 6,674,860 | B1 | 1/2004 | Pirila |
| 6,707,915 | B1 | 3/2004 | Jobst et al. |
| 6,774,926 | B1 * | 8/2004 | Ellis et al. ............... 348/14.01 |
| 6,804,357 | B1 | 10/2004 | Ikonen et al. |
| 2002/0039904 | A1 | 4/2002 | Anderson |

(Continued)

FOREIGN PATENT DOCUMENTS

AU    1659299    7/1999

(Continued)

OTHER PUBLICATIONS

GB Search Report dated Jan. 4, 2001, Application No. GB 0016238.8, 1 page.

(Continued)

*Primary Examiner*—David Q. Nguyen
(74) *Attorney, Agent, or Firm*—Harrington & Smith, PC

(57) ABSTRACT

The present invention relates to receivers such as multi-carrier and cellular receivers.

Cellular receivers, in the form of portable radiotelephones are commonplace, and their design and operation is well understood. Such portable radiotelephones can be used for making and receiving telephone calls, sending and receiving messages, and even browsing world-wide computer network such as the Internet. Many standards exist for portable radiotelephones, including global system for mobile communications (GSM), general radio packet service (GPRS)

Receivers capable of receiving digital television signals, such as signals according to the terrestrial digital video broadcasting (DVB-T) standard are also commonplace.

The present invention provides a method and apparatus for receiving and transmitting signals via multiple communication channels.

10 Claims, 2 Drawing Sheets

U.S. PATENT DOCUMENTS

2002/0059614 A1    5/2002    Lipsanen et al.

FOREIGN PATENT DOCUMENTS

| | | |
|---|---|---|
| CN | 1288619 | 3/2001 |
| DE | 4424380 | 1/1996 |
| EP | 0179612 | 4/1986 |
| EP | 0191684 | 8/1986 |
| EP | 0696152 | 2/1996 |
| EP | 0763942 A2 | 3/1997 |
| EP | 0782364 | 7/1997 |
| EP | 0804012 | 10/1997 |
| EP | 0957606 | 11/1999 |
| EP | 0999678 | 5/2000 |
| EP | 1300035 | 8/2006 |
| GB | 2294844 | 5/1996 |
| GB | 2335576 | 9/1999 |
| WO | 9636141 | 11/1996 |
| WO | 9856181 | 12/1998 |
| WO | 9904568 | 1/1999 |
| WO | 99/33076 | 7/1999 |
| WO | 9935771 | 7/1999 |
| WO | 0018123 | 3/2000 |

OTHER PUBLICATIONS

GB Search Report dated Jan. 17, 2001, Application No. GB 0016245.3, 3 pages.
GB Search Report dated Feb. 21, 2001, Application No. GB 0016245.3, 2 pages.
International Search Report dated Nov. 30, 2001, Application No. PCT/EP 01/07239, 7 pages.
International Search Report dated Feb. 21, 2002, Application No. PCT/EP 01/07209, 3 pages.
European Search Report dated Jul. 21, 2004, Application No. EP 04 00 0799, 3 pages.
Chinese Office Action dated Mar. 12, 2004, Chinese Application No. CN 01814700.3, 10 pages.
European Office Action dated Jan. 31, 2005, Application No. 01 957 887.1, 5 pages.
European Telecommunications Standard Institute, Digital Video Broadcasting (DVB); Interaction channel through the Global System for Mobile communications (GSM), Feb. 1999, 14 pages.

* cited by examiner

RECEIVER

BACKGROUND OF THE INVENTION

1. Field of the Invention

The present invention relates to receivers such as multi-carrier and cellular receivers.

2. Description of the Prior Art

Cellular receivers, in the form of portable radiotelephones are commonplace, and their design and operation is well understood. Such portable radiotelephones can be used for making and receiving telephone calls, sending and receiving messages, and even browsing world-wide computer network such as the Internet. Many standards exist for portable radiotelephones, including a global system for mobile communications (GSM), general radio packet service (GPRS)

Receivers capable of receiving digital television signals, such as signals according to the terrestrial digital video broadcasting (DVB-T) standard are also commonplace.

The use and operation of consumer set-top-boxes (STB) for receiving digital video broadcasting (DVB-T) transmissions are well known. Such STBs are capable of receiving a large number of digital television channels, data and other interactive services.

BRIEF SUMMARY OF THE INVENTION

According to a first aspect of the present invention, there is provided a terminal having a first receiver for receiving a first signal from a first communications network comprising a second receiver for receiving a second signal conveying complementary information relating to said first signal transmitted from a second communications network.

Advantageously, the present invention provides a receiver having a first and a second receiver for receiving signals from two different communications networks. In a first embodiment of the present invention this results in increased power efficiency, since one of the receivers can be effectively switched off when not required. Schedule or configuration data can, however, still be received on the other receiver. The received schedule or configuration data can be used to switch on the other receiver at an appropriate time. This configuration allows the receiver to receive non-scheduled data, such as news flashes, results from sporting events, share prices etc.

According to a second aspect of the present invention, there is provided apparatus for transmitting a signal to a receiver via a first communications network comprising a transmitter for transmitting complementary information relating to the signal via a second communication network.

According to a third aspect of the present invention, there is provided a method of receiving a first signal from a first communications network comprising receiving a second signal conveying complementary information relating to the first signal from a second communications network.

According to a fourth aspect of the present invention, there is provided a method of transmitting a signal to a receiver via a first communications network comprising transmitting complementary information relating to the signal via a second communication network.

BRIEF DESCRIPTION OF THE DRAWINGS

The invention will now be described, by way of example only, with reference to the accompanying diagrams, in which.

DETAILED DESCRIPTION OF THE PREFERRED EMBODIMENT

Figure 1:
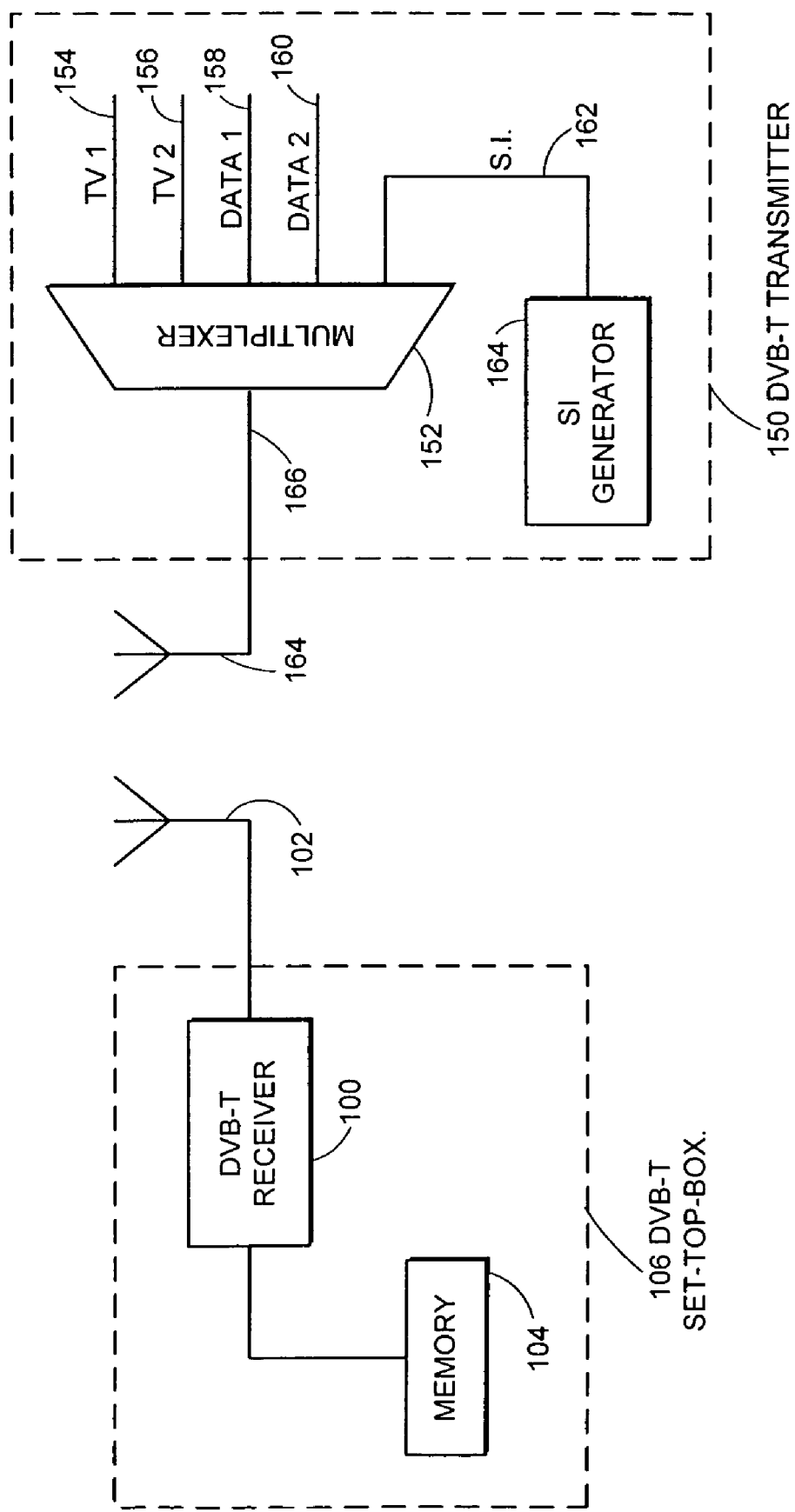
FIG. 1 is a block diagram of a typical consumer receiver/transmitter arrangement.

FIG. 1 is a block diagram of a typical consumer receiver/transmitter arrangement in which a terrestrial digital video broadcasting (DVB-T) transmitter 150 transmits a DVB-T signal to a DVB-T set-top-box receiver 106.

In the transmitter 150, a number of television channels 154 and 156 are multiplexed together with a number of data channels 158 and 160 by a multiplexer 152. In addition to this, service information (SI) 162, which contains details of each of the other multiplexed channels, is also input to the multiplexer 152, provided by a SI generator 164. The multiplexer creates a single, multiplexed, signal 166 which contains all of the separate channels 154, 156, 158 and 160, along with the SI 162. Further details of the multiplexing and SI may be found in the DVB-T specification (EN 300 468) which is incorporated herein by reference. The multiplexed signal 166 is transmitted via an antenna 164, across a transmission channel, to an antenna 102 of a set-top-box receiver 106. In the case of DVB-T, the transmission channel is a terrestrial transmission channel. However, the transmission channel could, alternatively, be a satellite, microwave, cable or optical channel.

The signals received by the antenna 102 are input to a DVB-T receiver 100 which enables the user to select a desired channel. Received data may also be stored in a memory 104.

When the set-top-box 106 is switched on, the DVB-T receiver 100 is also powered up and receiving DVB-T signals. The DVB-T receiver is constantly decoding SI information which provides details of the content and location of each of the channels within the received multiplexed signal. The SI information also contains schedule details for each of the multiplexed channels. The schedule details allow a user to watch or record a specific program of interest. For example, if the set-top-box 106 is connected to a personal computer (not shown), it is possible to receive data transmitted over the DVB-T network for use with the personal computer. In this way, the transmission of large data files can be broadcast, to a large audience, using the high data rates provided by DVB-T transmission. If a data file is due to be transmitted at a certain time on a certain channel, the SI information will contain this information which can be used by the personal computer to ensure that receiver receives the required data.

SI information may change frequently, to reflect not only changes in program scheduling, but also to reflect re-allocation of frequencies and channels etc by the broadcaster. For example, it is possible for a channel to broadcast on a different frequency to originally scheduled. Since the SI contains details of the frequencies (or changes to the frequencies), a receiver should always be able to receive the desired channel and/or program. Some set-top-boxes store SI information in a memory, thereby allowing users to browse a schedule or program guide. However, due to the nature of SI information, the SI information is updated frequently to ensure that no discrepancies exist between the SI stored by the set-top-box and the SI being transmitted by the broadcaster.

Figure 2:
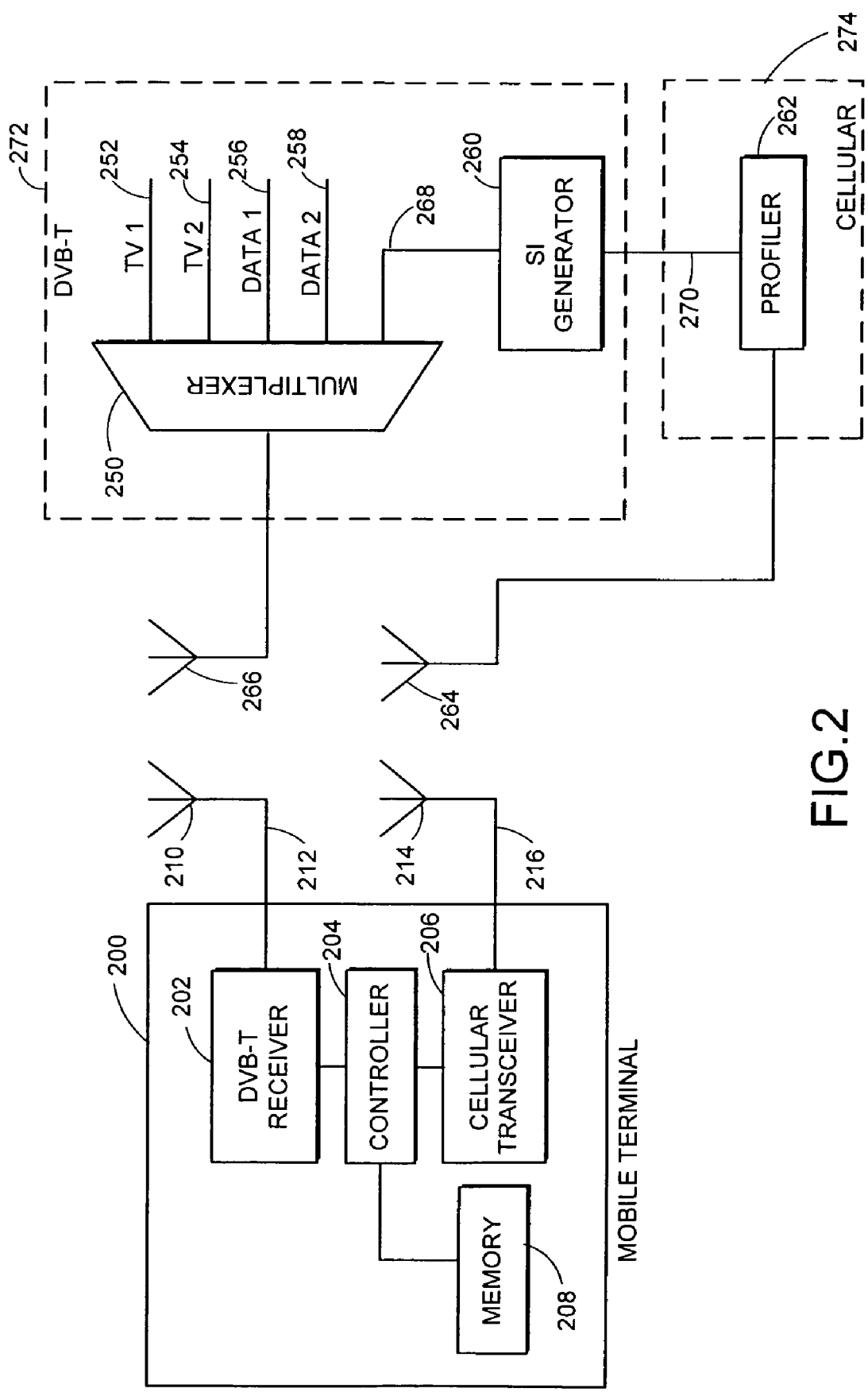
FIG. 2 is a block diagram of a first embodiment according to the present invention.

FIG. 2 shows a block diagram of a first embodiment according to the present invention. A mobile terminal 200 receives DVB-T transmissions from a DVB-T transmitter 272. The transmitted DVB-T signal is a multiplexed signal produced by a multiplexer 250. The multiplexer 250 accepts as inputs a number of channels 252, 254, 256 and 258 to produce the multiplexed signal. The channels may be television, audio or data channels. Service information (SI) data, which contains details of the multiplexed channels, is also input to the multiplexer 250. The SI data is generated by a SI generator 260, which may be a database containing schedule and location details of each of the channels.

The DVB-T signals are received by an antenna 210 of the mobile terminal 200 and are received and decoded by a DVB-T receiver 202.

In addition, and advantageously, the mobile terminal also receives an interactive channel from a cellular or other transmission network 274 at a cellular transceiver 206. The cellular transceiver 206 allows both the reception and transmission of signals between the mobile terminal 200 and the cellular network 274. The cellular network may be a GSM network, a general packet radio service (GPRS), third generation (3G) or other suitable network.

SI data generated by the 51 generator 260 is also supplied to a profiler 262 of the cellular network 274. The profiler contains a database of information about each of the subscribers to the cellular network 274. The profiler may contain information such as, demographic data, income level, sports leisure interests, etc.

The operation of a first embodiment of the present invention will now be described by way of example.

According to the prior art, if a user wishes to receive a video clip each time his favorite football team scores during a football match, it is necessary that the DVB-T receiver 100 in the DVB-T set-top-box 106 is constantly powered up and is constantly receiving SI data. This is since the exact timing of when a goal will be scored is not known in advance. Accordingly, no schedule will exist in the SI data for this event. A DVB-T receiver must therefore wait for the SI data to indicate when the video clip will be broadcast. If the user is only interested in receiving video clips of the football match, this is particularly inefficient in terms of power consumption, especially for mobile terminals, since the DVB-T receiver just waiting, consuming power, for a specific video clip to be broadcast.

According to a first embodiment of The present invention, as exemplified in FIG. 2, the subscriber registers his interest in receiving video clips with the profiler 262 of the cellular network 274. The DVB-T receiver 202 of the mobile terminal 200 may then be powered down. When a goal is scored, and a video clip is available for broadcast, the broadcaster must schedule the video clip to be included in the existing DVB-T multiplex signal. This may involve rescheduling existing programs, and updating the SI data accordingly. Once a scheduled time has been established for the broadcast of the video clip, a service announcement is sent by the cellular network 274 to the cellular transceiver 206. The service announcement is received by the cellular transceiver 206 and is processed by the controller 204. The controller informs the DVB-T receiver 202 of when the video clip will be broadcast and other relevant associated data, such as channel location, encryption parameters etc. The DVB-T receiver can be powered up and configured in time to receive and decode the video clip. The video clip may also be stored in a memory 208. Once the desired video clip, or other data, has been received, the DVB-T receiver 202 can be once again powered down.

The service announcement may be in the form of SI data, or may alternatively be in the form of a special short message service (SMS) message containing the necessary timing and location information required by the DVB-T receiver. Alternative forms of service announcement may be used, both in terms of the data required to be sent and the protocol which is used for sending it.

In this way, the DVB-T receiver 202 can be powered down when not required for actual reception of data. This can produce large savings in power consumption, compared to the system of the prior art.

The profiler 262 also controls whether requested information is transmitted to a user via the DVB-T or cellular network. For example, if one million people have requested to see a video clip of goals from a particular football match, it is better to transmit the video clip via the DVB-T network. For such a large number of users, the DVB-T network provides a cost effective delivery means. The alternative would be to individually send the video clip via the cellular network which, with so many users, could impact severely on the operation of the cellular network.

If the number of users requesting to see a particular video clip is much smaller, it may be more economical to send it individually via the cellular network. The exact threshold levels will vary according to the pricing structure of the DVB-T and cellular networks, as well as the number of users requesting a particular item, and the volume of data required to be sent.

The cellular transceiver 206 may also be used to send an acknowledgement back to the cellular network 274, indicating whether the video clip was correctly received. This may be used for billing purposes, or also to request a re-sending of the video clip if it not received due to poor signal strength etc. Re-sending of the video clip may again take place either via the DBV-T or cellular network depending on demand and cost effectiveness.

A further advantage of the present invention is that, if schedule announcements are sent over the cellular network, it is possible to remove some or all of the SI data from DVB-T network. Since the SI data typically occupies up to 3 $\text{Mbits}^{-1}$ this redundant bandwidth could be used for providing additional data or video channels.

In a further embodiment of the present invention, a profiler may be included in the mobile terminal 200. This may be instead of, or in addition to, the profiler 262 of the cellular network 274. A profiler on the mobile terminal may be used if the communications network used for the interactive channel supports broadcasting of data, such as via a GPRS network or other packet type network. The profiler can be configured according to user preferences, and wilt only accept service announcements which comply with the user preferences.

Those skilled in the art will appreciate that although the present invention is described above with reference to DVB-T transmissions, the invention is not limited thereto. The same techniques could be applied to DVB (satellite) reception and transmission or any other similar or equivalent standards. Equally, references to cellular networks and cellular transmission techniques could be replaced by fixed line, public switched telephone networks, or any other type of suitable communications network.

It will be apparent from the foregoing the present invention is not limited to the delivery of televisual content. Indeed, as has been indicated previously, digital video broadcasting may provide data and other interactive services.

For example, on-line banking and other customer orientated services can use the present invention to improve the transmission of data, including Internet pages, to subscribers. For example, an on-line bank could broadcast using the broadcast network pages of information containing high quality graphics, standard texts etc. Each page could then be personalized using personal data transmitted over an interactive channel provided by a second network such as GSM, GPRS or other future generation network. For example, a generic 'balance' sheet could be broadcast to all users containing the bank logo, background images etc. Personal balance data transmitted over the interactive channel could then be combined with the broadcast 'balance' sheet, to present to the user their own personal balance sheet.

What is claimed is:

1. A mobile terminal having a first receiver for receiving a first signal from a first communications network including a communication service, the mobile terminal comprising:
    a second receiver within said mobile terminal for receiving a second signal conveying complementary information, relating to the communication service included in said first signal, transmitted from a second communications network and said complementary information comprises an announcement relating to the communication service, wherein the mobile terminal determines a receiving schedule of the first receiver based on the complementary information,
    further comprising a memory configured to store user preferences and a controller configured to decide whether to enable said first receiver in dependence on the stored user preferences.

2. A terminal according to claim 1, wherein the controller configures said first receiver according to said complementary information.

3. A terminal according to claim 1, wherein said first receiver is enabled to receive said first signal in response to said complementary information.

4. A terminal according to claim 1, wherein said complementary information comprises configuration data for configuring the first receiver.

5. A terminal according to claim 1, wherein said first signal is a digital video broadcasting signal, and said first receiver is a digital video broadcasting receiver.

6. A terminal according to claim 1, wherein said second signal is a global system for mobile signal, and said second receiver is a global system for mobile receiver.

7. A terminal according to claim 1, wherein said second signal is a general packet radio service signal, and said second receiver is a general packet radio service receiver.

8. A terminal according to claim 1, wherein the first signal includes a data file, said terminal being actuable in response to said complementary information to receive said data file.

9. A method of receiving a first signal by a first receiver of a mobile terminal from a first communications network, wherein said first communications network includes a communication service, the method comprising the steps of:
    receiving a second signal with a second receiver of said mobile terminal, said second signal conveying complementary information relating to the communication service included in said first signal transmitted from a second communications network and said complementary information comprises an announcement relating to the communication service, wherein the mobile terminal determines a receiving schedule of the first receiver based on the complementary information, and further comprising the steps of storing user preferences and deciding whether said second signal should be received in dependence on said stored user preferences.

10. A method according to claim 9, comprising receiving said first signal in accordance with said complementary information.

* * * * *